United States Patent
Cochran et al.

(12) 
(10) Patent No.: US 6,229,146 B1
(45) Date of Patent: May 8, 2001

(54) POSITION SENSITIVE RADIOACTIVITY DETECTION FOR GAS AND LIQUID CHROMATOGRAPHY

(75) Inventors: Joseph L. Cochran, Knoxville; John F. McCarthy, Loudon; Anthony V. Palumbo, Oak Ridge; Tommy J. Phelps, Knoxville, all of TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/164,107

(22) Filed: Sep. 30, 1998

(51) Int. Cl.[7] ....................................... G01T 1/20
(52) U.S. Cl. ................. 250/364; 250/370.1; 250/370.11
(58) Field of Search .................................. 250/364, 370.1, 250/370.11, 369, 356.2, 370.02

(56) References Cited

U.S. PATENT DOCUMENTS

| | | | |
|---|---|---|---|
| 4,638,158 | * 1/1987 | Sonne et al. | 250/266 |
| 4,704,531 | * 11/1987 | Berthold et al. | 250/328 |
| 4,830,830 | * 5/1989 | Tamotu et al. | 204/603 |
| 4,975,583 | * 12/1990 | Spowart | 250/364 |
| 5,793,046 | * 8/1998 | Jeffers et al. | 250/364 |
| 5,856,670 | * 1/1999 | Rapkin et al. | 250/252.1 |

* cited by examiner

Primary Examiner—Constantine Hannaher
Assistant Examiner—Albert Gagliardi
(74) Attorney, Agent, or Firm—Hardaway/Mann IP Group; Nexsen Pruet Jacobs & Pollard, LLC; Oscar A. Towler, III

(57) ABSTRACT

A method and apparatus are provided for the position sensitive detection of radioactivity in a fluid stream, particularly in the effluent fluid stream from a gas or liquid chromatographic instrument. The invention represents a significant advance in efficiency and cost reduction compared with current efforts.

8 Claims, 2 Drawing Sheets

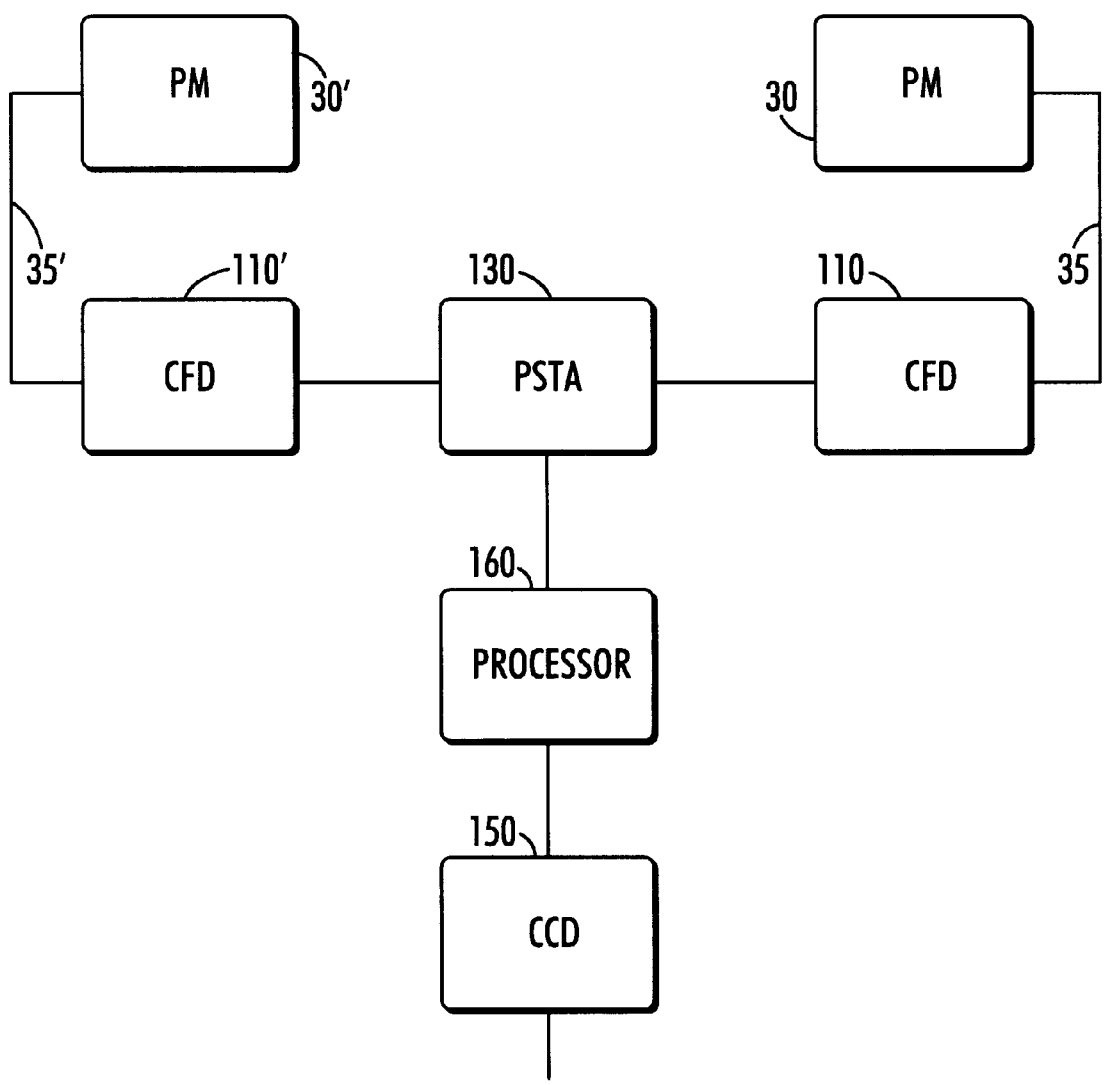

POSITION SENSITIVE RADIOACTIVITY DETECTION FOR GAS AND LIQUID CHROMATOGRAPHY

STATEMENT AS TO RIGHTS TO INVENTIONS MADE UNDER FEDERALLY SPONSORED RESEARCH AND DEVELOPMENT

The U.S. Government has rights in this invention pursuant to contract number DE-AC05-84OR21400 between Lockheed Martin Energy Research Corporation and the Department of Energy.

BACKGROUND OF THE INVENTION

This invention relates to a method and apparatus for the position sensitive detection and analysis of radioactivity in a fluid stream, and more particularly to such detection and analysis in gas and liquid chromatography.

Chromatography has been an important research tool for many years in a wide variety of applications. The principles of chromatography are well known to those of ordinary skill in the art. Essentially, a sample containing a mixture of constituent components, referred to herein as analytes, is introduced into a fluid stream. In a simple type of chromatographic apparatus, the fluid stream is brought into contact with a resin bed. The resin has been chemically or physically treated so as to selectively retard the passage of the analytes. The result is that the sample mixture is collimated, that is, separated into its discrete analytes. The fluid stream with the collimated sample then flows out, as an effluent stream, from the collimating means. The collimated effluent fluid stream is typically passed through a detector or analyzer which determines the presence, amount, and or type of analyte. The presence of a particular analyte can be depicted graphically as a peak on a chart. The timing and size of each peak provides significant information regarding the analyte.

While chromatographic techniques and technology have enjoyed great advances generally, one aspect of chromatography has not. This area is the detection and analysis of radioactive and radiolabelled analytes. Indeed, the current state of the art in this area has not changed greatly since the early 1970's except for the fairly peripheral advancements in the use of computers and integrated circuits.

The current method of radioactivity detection in gas chromatography is referred to as gas proportional counting (GPC). Typical of the state of the art in this regard is the original design of the Packard Model 894 counter used for GPC. In this instrument the effluent stream from the chromatograph contains or has added to it a quenched gas. The stream is then passed into a counting tube. In the counting tube is mounted a high voltage wire. Radioactive decay events, such as the emission of a beta particle or a gamma ray, create ions in the gas stream, which in turn is electrically detected via the wire. The events can be detected and counted to determine the presence and approximate amount of the radioactive analyte in the tube.

This technology has significant limitations. The wire in the counting tube is sensitive to background noise such as ambient radiation and radiation from internally deposited debris. The apparatus can be "tuned," that is, adjusted so as to increase efficiency, but is then sensitive to voltage and gas fluxes that may produce false readings. Typically, then, the instruments are not tuned in order to increase operational ease at the expense of analytical efficiency.

The resolution capability of this type of instrument also lags significantly behind the resolution capability of modern gas chromatography. Modern gas chromatography can separate and resolve many analyte peaks per minute. The state of the art GPC, however, can only recognize a single peak for all decay events occurring within the entire volume and length of the counting tube. Peak detection for radioactivity is thus limited to less than one per minute, making it impossible to correlate the radioactivity peak with the analyte peaks. Moreover, due to low counting efficiencies, quenching, detuning, and high background, detecting smaller radioactive peaks (for example, less than 250 disintegrations per minute (dpm)) is difficult. Thus a small but analytically important radiolabelled analyte may be completely missed or ignored by even modern GPC detectors.

Problems exist with radioactive assays performed with liquid chromatography also. In order to detect radioactive analytes, the liquid effluent stream from a liquid chromatograph must include or be mixed with liquid scintillation fluid. Decay events excite the liquid scintillation fluid to produce light, which can then be detected and measured. This process is expensive and inefficient. Relatively large amounts of scintillation fluid must be used and then safely disposed. Sample sizes typically must be larger, increasing the trouble and expense of obtaining the sample analyte.

SUMMARY OF THE INVENTION

It is an object of this invention to provide a method and apparatus for position sensitive detection of radioactivity in a fluid stream.

It is a further object of this invention to provide a highly efficient and relatively inexpensive method and apparatus for detecting the position of a radioactive decay event in a fluid stream.

It is a further object of this invention to provide a method and apparatus that can be used in conjunction with standard liquid or gas chromatography techniques to obtain position sensitive data regarding radiolabelled analytes in the chromatographic effluent stream.

This invention is a method and apparatus that provides for the highly efficient, yet relatively inexpensive, detection and analysis of radioactive or radiolabelled material in a fluid stream. More particularly, it can be used in chromatographic analysis to detect and measure radioactive or radiolabelled analytes in the effluent fluid stream from the chromatograph, providing higher and faster peak resolution while requiring a smaller sample size of the analytes in question. The invention is useful with both types of fluid (liquid or gas) chromatography. The method and apparatus have even broader application in any system having a fluid stream where position sensitive detection of radioactivity is desired.

In one embodiment of the invention, the apparatus comprises a channel through which the effluent fluid carrying the collimated analytes passes. A scintillant material, reactive to radioactive decay events such as the emission of a beta particle, is placed along the channel, at or near it, so as to be exposed to radioactive decay events occurring in the fluid. The channel and the scintillant can take any desired shape or geometry as is known to those of ordinary skill in the art. Detectors, for example in the case of a light-emitting scintillant, photomultiplier tubes, are placed so as to detect the effect on the scintillant of a decay event. Each detector will produce an output voltage, or output signal, upon detecting light emitted from the scintillant indicative of a radioactive decay event. The output signals of the detectors can then be analyzed by conventional means to generate data indicative of the number, position, and other characteristics of the decay event. The data can then be displayed in any conventional manner, such as in the form of graphs, histograms, and the like. The data can also be processed in conjunction with other data from the chromatograph, such as is obtained by the conventional chromatograph detector.

While there are many known ways to place detectors with respect to a scintillant, in one embodiment of this invention a detector is placed at either end of the scintillant. The output signals from the paired detectors can be transmitted to an analytically means. The analytical means can compare the output signals of the pair of detectors by a comparator of conventional design to determine the time differential between the respective output signals produced by a single event. The time differential provides an indication of the position of the event along the scintillant, and hence an indication of the position of the radioactive analyte within the channel and the fluid stream. An accumulator, or counter, can utilize the output of either the photomultipler tubes or the comparator to generate data indicative of the total number of events detected. The accumulator can determine the number of events as a matter of time or volume as desired. The output from the comparator and/or the accumulator can also be input to a processor also receiving data from the chromatograph's conventional detector and/or a flow meter, whereby the radioactive peaks can be compared to the conventional analyte peaks to derive additional data.

In an alternative embodiment of the invention, a plurality of detectors can be placed along the channel rather than at the ends thereof. The output signals of the detectors are transmitted to the analytical means which in this embodiment would provide an indication of the position of the decay event based on which detector provided the output signal. Accumulator means and processor means would provide data as described above.

The channel and scintillant can be coated or covered so as to reduce the amount of background noise caused by ambient events and light.

In one embodiment of this invention, the scintillant is a solid, such as plastic, and the channel itself is made in or of the solid scintillant.

In another embodiment of the invention, the effluent stream can be divided, e.g., by a manifold, and allowed to flow through more than one channel, each channel having or being a scintillant and having detectors. The output signals from the detectors can be analyzed by comparators, accumulators, and/or processors and the data for each channel synchronized with that from other channels for analytical purposes.

BRIEF DESCRIPTION OF THE DRAWINGS

FIG. 3 is a schematic depiction of one means for analyzing the detector output signals by comparing, accumulating, and processing the output signals of the detectors.

DETAILED DESCRIPTION OF THE PREFERRED EMBODIMENTS

Figure 1:
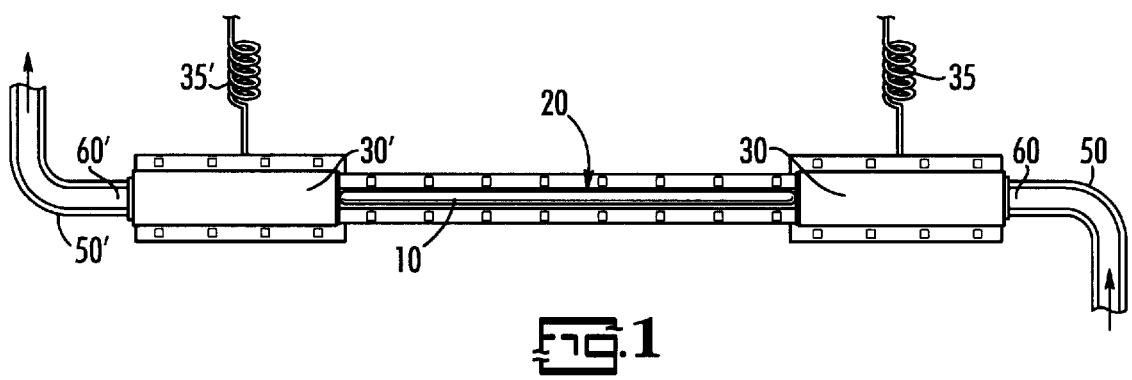
FIG. 1 is a schematic depiction of the channel, scintillant, and detector assembly along the fluid stream, wherein the detectors are placed at either end of the channel.

A schematic illustration of one possible arrangement of the channel, the scintillant, and the detectors is shown in FIG. 1. This illustration is equally applicable to either gas or liquid fluid applications. A channel 10 is provided through which the effluent stream carrying the collimated analytes is directed. The fluid stream flows through a tube or conduit 50 to enter the channel 10 at a point 60 in the direction of the arrow as shown. The source of the fluid stream in conduit 50 may be a chromatograph. The stream flows out of channel 10 through outflow conduit 50', leaving channel 10 at a point 60', as schematically shown by the arrow. The direction of flow is, of course, arbitrary: it is only necessary that the fluid flow through the channel. The direction of flow and the geometry of channel 10 will depend on a variety of known factors. Outflow conduit 50' may be a continuation of conduit 50, or may be a separate conduit piece connected to channel 10 at point 60'.

Channel 10 can be made of any conventional material transparent to radioactive decay events. It can be a portion of conduit 60, 60', or of either, or made separately. It is desirable that channel 10 have the smallest practical diameter so as to minimize the chance that an event will be masked by absorption by the fluid and/or by the analyte itself.

A scintillant 20, is provided alongside channel 10. Scintillant 20 can take any of several forms. In one embodiment of the invention, scintillant 20 is a solid, such as a solid plastic. In another, scintillant 20 can be a contained liquid, such as a fluid contained within a closed tube. The material from which the tube is made in the latter embodiment should be transparent to decay events.

Scintillant 20 can be of any desired length or form consistent with its purpose. The length of scintillant 20 may be a necessary datum for precise evaluation of event occurrences. Scintillant 20 can also be made of any material that will produce an effect in response to an event. Typically a scintillant produces light emissions in response to a decay event, but any scintillant may be chosen so long as it produces a detectable emission or signal in response to a decay event. Other examples of useful scintillants are so-called mediated scintillants wherein a decay event creates an effect in one substance which in turn causes a second, associated substance to produce light or some other detectable emission.

The choices of length, form, and material of scintillant 20 can be chosen depending on known factors, including for example the type of analyte to be detected, the geometry of channel 10, and the like. The factors determining these parameters are well known to those of ordinary skill in the art.

Channel 10 and scintillant 20 can take any desired shape and/or path geometry. Additionally, in one embodiment of this invention, channel 10 is formed directly from scintillant 20 in which case channel 10 is both the channel and the scintillant . The material from which scintillant 20 is made can be formed into a desired channel, or a channel can be made, for example, by drilling through the scintillant material.

In the schematic illustration of FIG. 1, the means for detecting the emissions of scintillant 20 in response to a decay event are shown at 30 and 30'. Because a scintillant typically emits light in response to a decay event, scintillant 20 will likely (but need not) be of that type. Detector means 30, 30' will therefore typically be photomultiplier tubes (PMs). PMs are well known in the art, and react to light by generating an output signal. In its simpler form, the output signal is an output voltage proportionate to the amount of light detected. More modern instrumentation may enable the output signal to be digital or be digitized by known means. In the schematic representation of FIG. 1, output signal connectors are shown respectively at 35, 35'. Connectors 35, 35' transmit the respective output signals to analytical means described below with respect to FIG. 3.

Figure 2:
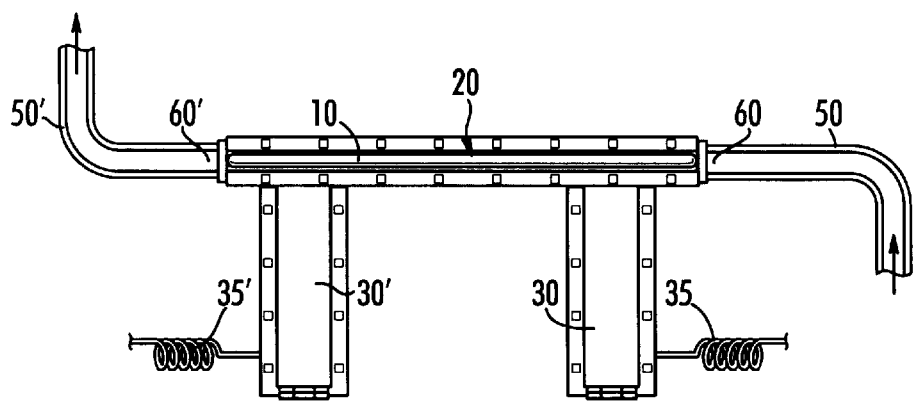
FIG. 2 is a schematic depiction of the channel, scintillant and detector assembly along the fluid stream, wherein a plurality of detectors is positioned along the channel.

FIG. 2 is a schematic representation of another embodiment of the invention. The numbering scheme of FIG. 1 is retained because the nature of the components is not changed. In the apparatus illustrated in FIG. 2, the detectors 30, 30' are placed along channel 10 instead of at the ends thereof as shown in FIG. 1. Each detector is placed so as to be reactive to decay events occurring within the stream. There may be a plurality of additional detectors (not shown) depending on the length and geometry of channel 10. In this alternative embodiment, each detector will detect decay events within only a portion of channel 10. An output signal from one of the detectors will provide an indication of the position of the decay event simply by knowing which detector sensed the decay event.

FIG. 3 is a schematic representation of one analytical means for analyzing the data represented by the output signals from detectors 30, 30'. Detectors 30, 30' may be positioned as illustrated in either FIG. 1 or FIG. 2, and there may be additional detectors. Detectors 30, 30' are connected by connectors 35, 35', respectively so as to send the output signals thereof to a means for comparing the respective output signals. The output signals from detectors 30, 30' may be connected to respective constant fraction discriminators (CFD) 110 and 110'. CFDs 110 and 110' function to convert the detector output signals to timing signals. CFD 110 functions identically to CFD 110'. CFD 110 processes the output signal from detector 30 to determine whether the decay event was strong enough to cross a predetermined threshold. If so, CFD 110 generates a time signal indicative of the time the decay event was detected. CFD 110' will detect the same decay event and send a similar signal. The timing signal outputs of CFDs 110 and 110' are transmitted to a picosecond time analyzer (PSTA) 130. PSTA 130 is a conventional instrument capable of interpreting the converted output signals to indications of the positions of the decay events detected by detectors 30, 30'. The output of PSTA 130 can then be used to record, display, or otherwise manipulate the data. PSTA 130 will also include accumulator means, such as conventional electronic counters, to generate data representative of how many decay events were detected, and to associate such data with the position indicating data. The data can then be displayed, for example, as conventional peaks.

The output of PSTA 130 can also be transmitted to a processor means 160. Processor means 160 can be any suitable processor known to those of ordinary skill in the art, for example, a computer with appropriate software. Processor means 160 can further manipulate the detector data, for example, to compare the data regarding decay events with the data generated by a conventional chromatography detector (CCD) 150. CCD 150 is intended to include any known apparatus used, for example, to detect, quantify, display, record, or otherwise manipulate data representative of the analytes in a given sample. Such conventional detectors are typically an integral part of the chromatograph.

An older, alternative analytical means for analyzing the output signals from detectors 30, 30' consists of connecting CFDs 110, 110' to a time-to-amplitude converter (TAC). A TAC is a comparator means which compares the output from CFDs 110 and 110'. This comparison provides a signal indicative of the position of the decay event. The TAC is connected to a multi-channel analyzer (MCA) which can provide an accumulator means to provide an indication of the number of decay events and to associate this number with the position of the decay events. This data can also be recorded, displayed, or otherwise manipulated as indicated above. Likewise, the data may be transmitted to a processor means such as processor 160 shown in FIG. 3.

The analytical means shown in FIG. 3 is constructed from commercially available instruments and electronics. There may be several individual elements performing the indicated functions, or the entire analytical means may be incorporated into a single device.

The foregoing description of the claimed invention is of necessity simplified and by way of example only. For example, it may prove useful to interpose various electronic filters and amplifiers between detectors 30 and 30' and CFDs 110 and 110', respectively, to refine the output signals of the detectors. Also, there are different varieties of commercially available PSTAs or equivalents thereto, or ones that use the output signals to determine position in a different manner.

An alternative to having a single channel through which the fluid stream is directed is to split the stream into a plurality of channels. Each channel would have associated detectors. The channels should be set in parallel, either physically or by manipulation of the respective generated data so as to preserve the collimation of the sample. Providing a plurality of a channels means that each separate channel can be very narrow and the scintillant can be very close to the analyte entrained in the stream. This can be useful where the sample, and hence the radioactivity, is very small or where the fluid in which the analyte is entrained tends to absorb or block the emissions from radioactive decay events.

The nature of the chromatograph, the nature and type of analytes and fluid streams, and simple design choice may lead to several modifications of the disclosed device. There are several different types of instruments commercially available to process the data from decay events. All of these modifications and substitutions are considered within the scope of the novel invention disclosed herein and embodied in the claims below.

What is claimed is:

1. A position sensitive radioactivity detector for analyzing radioactive decay events in a fluid stream comprising:
   (a) at least one channel of predetermined length through which said stream is directed;
   (b) at least one scintillant exposed to said stream in said channel, said scintillant extending along said channel and having a first end and a second end;
   (c) at least two detectors capable of detecting the effect on said scintillant of a radioactive decay event occurring within said channel and producing an output signal proportionate to said decay event; and
   (d) analytical means connected to said detector means and responsive to said output signal for providing an indication of the position and number of said decay events within said channel.

2. The apparatus of claim 1 wherein said detectors comprise:
   at least a first detector at said first end of said scintillant and at least a second detector at said second end of said scintillant, each detector capable of detecting the effect on said scintillant of a radioactive decay event occurring within said channel and producing an output signal proportionate to said decay event.

3. The apparatus of claim 2 wherein said analytical means comprises:
   (d) (i) comparator means for comparing said output signal from said first detector and said second detector and producing a comparator output signal whereby the position of said decay event within said channel can be determined;

(d)(ii) accumulator means connected to said comparator means and responsive to said comparator output signal whereby an accumulator output signal is generated indicative of the quantity of decay events.

4. The apparatus of claim 1 further comprising:

(f) a covering for said scintillant shielding said scintillant from ambient radioactive decay events and light.

5. The apparatus of claim 1 wherein said scintillant forms said channel.

6. The apparatus of claim 1 or claim 3 further comprising:

(g) processor means connected to said analytical means for comparing said indication of the position and number of decay events within said channel with other data.

7. A position sensitive radioactivity detector for analyzing radioactive decay events in an effluent stream from a chromatography device, said effluent stream comprising analytes entrained in a fluid, comprising:

(a) a plurality of channels of predetermined length through which said stream is directed;

(b) a plurality of scintillants associated with said plurality of channels such that each scintillant is exposed to said stream in one of said plurality of channels;

(c) at least two detectors associated with each scintillant of said plurality of scintillants, said detectors capable of detecting the effect on said scintillant of said decay events and capable of producing an output signal proportionate to said decay events;

(d) analytical means connected to said detectors and responsive to said output signal whereby the number and position of decay events within said plurality of channels can be determined.

8. A method for position sensitive detection of radioactivity in a fluid stream comprising:

(a) exposing said stream to a solid scintillant of predetermined length, said scintillant having a first end and a second end;

(b) positioning a first detector means at said first end and a second detector means at said second end of said scintillant, each detector means capable of detecting the effect on said scintillant of a radioactive decay event occurring within said stream, said first detector means producing a first output signal and said second detector means producing a second output signal;

(c) comparing said first output signal to said second output signal to determine the position of said event with respect to said scintillant.

* * * * *